United States Patent
Maruyama et al.

(10) Patent No.: US 11,441,608 B2
(45) Date of Patent: Sep. 13, 2022

(54) SINTERED BEARING FOR MOTOR-TYPE FUEL PUMP AND PRODUCTION METHOD THEREFOR

(71) Applicant: DIAMET CORPORATION, Niigata (JP)

(72) Inventors: Tsuneo Maruyama, Niigata (JP); Yoshinari Ishii, Niigata (JP)

(73) Assignee: DIAMET CORPORATION, Niigata (JP)

( * ) Notice: Subject to any disclaimer, the term of this patent is extended or adjusted under 35 U.S.C. 154(b) by 405 days.

(21) Appl. No.: 16/492,520

(22) PCT Filed: Jun. 28, 2018

(86) PCT No.: PCT/JP2018/024684
§ 371 (c)(1),
(2) Date: Sep. 9, 2019

(87) PCT Pub. No.: WO2019/004384
PCT Pub. Date: Jan. 3, 2019

(65) Prior Publication Data
US 2021/0131494 A1    May 6, 2021

(30) Foreign Application Priority Data
Jun. 29, 2017    (JP) .............................. JP2017-127093

(51) Int. Cl.
*C22C 9/06* (2006.01)
*F16C 33/12* (2006.01)
(Continued)

(52) U.S. Cl.
CPC ............... *F16C 33/12* (2013.01); *B22F 3/11* (2013.01); *B22F 5/106* (2013.01); *C22C 1/0425* (2013.01);
(Continued)

(58) Field of Classification Search
CPC ........ F16C 17/02; F16C 33/12; F16C 33/128; F16C 33/14; F16C 33/145; F16C 33/1045;
(Continued)

(56) References Cited

U.S. PATENT DOCUMENTS 5,126,212 A * 6/1992 Yamada ................. F16C 33/24
428/156
5,714,700 A * 2/1998 Nishida ................. B22F 1/0003
419/36
(Continued)

FOREIGN PATENT DOCUMENTS

CN       1950606 A * 4/2007 .............. F04C 2/084
CN     103201398 A    7/2013
(Continued)

OTHER PUBLICATIONS

First Examination Report dated Mar. 18, 2021 for the corresponding Indian Patent Application No. 201917038757.
(Continued)

*Primary Examiner* — George Wyszomierski
(74) *Attorney, Agent, or Firm* — Leason Ellis LLP

(57) ABSTRACT

Provided is a bearing for a motor-type fuel injection pump. This bearing is composed of a Cu—Ni-based sintered alloy, inexpensive and has a superior corrosion resistance and abrasion resistance. The bearing contains 10 to 20% by mass of Ni, 2 to 4.5% by mass of Sn, 0.05 to 0.4% by mass of P, 2 to 7% by mass of C, and a remainder consisting of Cu and inevitable impurities. The bearing has a metal structure where Sn is uniformly dispersed and distributed in a metal matrix, and has a porosity of 7 to 17% where a free graphite is dispersed and distributed in pores.

1 Claim, 3 Drawing Sheets

(51) Int. Cl.
  *B22F 5/10* (2006.01)
  *C22C 1/04* (2006.01)
  *F16C 17/02* (2006.01)
  *B22F 3/11* (2006.01)
  *C22C 32/00* (2006.01)
  *F16C 33/14* (2006.01)

(52) U.S. Cl.
  CPC ............ *C22C 9/06* (2013.01); *C22C 32/0084* (2013.01); *F16C 17/02* (2013.01); *F16C 33/145* (2013.01); *B22F 2301/10* (2013.01); *F16C 2204/10* (2013.01); *F16C 2220/20* (2013.01)

(58) Field of Classification Search
  CPC .............. F16C 2204/10; F16C 2202/10; F16C 2202/52; F16C 2220/08; F16C 2220/20; F16C 2360/22; F16C 2260/44; B22F 5/106; B22F 3/12; B22F 2301/10; B22F 3/02; B22F 3/10; C22C 1/0425; C22C 9/06
  See application file for complete search history.

(56) References Cited

U.S. PATENT DOCUMENTS

| | | | |
|---|---|---|---|
| 7,763,363 B2* | 7/2010 | Shimizu | C22C 13/00 |
| | | | 428/647 |
| 9,663,844 B2* | 5/2017 | Ishii | C22C 1/05 |
| 2009/0011268 A1 | 6/2009 | Shimizu et al. | |
| 2009/0311129 A1 | 12/2009 | Harakawa et al. | |
| 2012/0204677 A1* | 8/2012 | Ishii | C22C 30/02 |
| | | | 75/244 |
| 2013/0189150 A1 | 7/2013 | Ishii et al. | |
| 2014/0376845 A1* | 12/2014 | Takezoe | C22C 1/08 |
| | | | 384/279 |
| 2015/0064045 A1 | 3/2015 | Jinnou et al. | |
| 2016/0223018 A1 | 8/2016 | Ito et al. | |
| 2017/0282250 A1 | 10/2017 | Takezoe et al. | |
| 2017/0283911 A1 | 10/2017 | Ishii et al. | |

FOREIGN PATENT DOCUMENTS

| | | | | |
|---|---|---|---|---|
| JP | 2006-199977 A | | 8/2006 | |
| JP | 2008-7796 A | | 1/2008 | |
| JP | 2008007794 A | * | 1/2008 | ............ F16C 33/121 |
| JP | 2013144849 A | * | 7/2013 | |
| JP | 2013-217493 A | | 10/2013 | |
| JP | 2013-237898 A | | 11/2013 | |
| JP | 2015187307 A | * | 10/2015 | |
| JP | 2015-227500 A | | 12/2015 | |
| JP | 2016-53200 A | | 4/2016 | |
| JP | 2016-056427 A | | 4/2016 | |
| JP | 2017-9033 A | | 1/2017 | |
| WO | WO-2012/063785 A1 | | 5/2012 | |
| WO | WO-2012063786 A1 | * | 5/2012 | ............ C22C 1/1084 |
| WO | WO-2013172326 A1 | * | 11/2013 | ............ C22C 1/0483 |
| WO | WO-2016035880 A1 | * | 3/2016 | ................ B22F 3/16 |

OTHER PUBLICATIONS

International Search Report dated Sep. 25, 2018 for the corresponding PCT International Application No. PCT/JP2018/024684.

* cited by examiner

Electron micrograph 1

C Kα1_2

Ni Kα1

Cu Kα1

Sn Lα1

P Kα1

SINTERED BEARING FOR MOTOR-TYPE FUEL PUMP AND PRODUCTION METHOD THEREFOR

CROSS-REFERENCE TO RELATED PATENT APPLICATIONS

This application is a U.S. National Phase Application under 35 U.S.C. § 371 of International Patent Application No. PCT/JP2018/024684, filed Jun. 28, 2018, and claims the benefit of priority to Japanese Patent Application No. 2017-127093, filed Jun. 29, 2017, all of which are incorporated by reference herein in their entireties. The International Application was published in Japanese on Jan. 3, 2019 as International Publication No. WO/2019/004384 under PCT Article 21(2).

FIELD OF THE INVENTION

The present invention relates to a sintered bearing for a motor-type fuel pump and a method for producing the same. The sintered bearing of the present invention is composed of a Cu—Ni-based sintered alloy, and has an excellent abrasion resistance such that it is capable of being used under an environment evolving an inexpensive and low-quality gasoline containing an organic acid(s).

BACKGROUND OF THE INVENTION

There are many parts in the world where it is inevitable to use, as auto fuels, low-quality fuels containing sulfur and/or an organic acid(s). The globalization of the auto market has caused problems such as air pollution and global warming which are attributed to the exhaust gases from automobiles using such low-quality fuels.

In recent years, as an environmental preservation measure, the auto industry is spreading and expanding the usage of a fuel pump shown in FIG. 3 and EGR (exhaust gas recirculation) for the purpose of improving fuel efficiency. Further, since auto fuels also contribute to air pollution, various parts in the world have been working on employing, as a fuel, an alcohol utilizing the energy of biomass or a gasoline containing such alcohol in order to reduce the sulfur concentration in a fuel and the amount of $CO_2$ emission. However, there has been a problem where an organic acid(s) is to be generated as the alcohol decomposes in a biomass fuel produced by adding the alcohol to a gasoline or a light oil, and such organic acid(s) will then corrode a bronze-based sintered bearing of a fuel pump.

As a bearing for a fuel pump that has a superior corrosion resistance against a low-quality fuel containing sulfur and/or organic acids at a high concentration as a result of the globalization of automobiles, those disclosed in Patent documents 1 and 2 are known, for example. However, large amounts of Ni and Sn which are expensive are used in these bearing members, and there has thus been a problem where the cost is high. That is, since the bearing disclosed in Patent document 1 contains Sn which is expensive by an amount of 5 to 12% by mass; and Ni which is also expensive by an amount of 21 to 35% by mass, the material cost is high. As for the bearing disclosed in Patent document 2, although attempts have been made to reduce the material cost by reducing the amount of Ni used in the bearing disclosed in Patent document 1, the cost reduction is inadequate due to the fact that Sn which is even more expensive than Ni is contained in an amount of 5 to 12% by mass.

Further, Patent documents 3 and 4 disclose aluminum bronze-made bearings utilizing, as a bearing material, Al which is inexpensive. These bearings are capable of reducing the material cost, because they are sintered bearings made of an aluminum bronze containing Al which is inexpensive, but containing no Ni and/or Sn which are expensive. However, when sintering an Al-containing aluminum bronze, sintering does not progress smoothly as Al is easily oxidized at the time of sintering. As a countermeasure, it is required to add to a raw material powder a sintering aid made of aluminum fluoride and calcium fluoride; use a hydrogen gas, a nitrogen gas or a mixed gas thereof as a sintering atmosphere; and then increase a sintering time. In this way, such a kind of countermeasure is necessary, not only because a low productivity is observed with the sintering of aluminum bronze, but also because when sintering aluminum bronze, a sintering furnace may be corroded by a fluorine-based gas occurring as the aid made of aluminum fluoride and calcium fluoride undergoes thermal decomposition. Therefore, there has been a problem where an increase in the production cost is unavoidable in the cases of the bearings disclosed in Patent documents 3 and 4, and a high total cost will thus be incurred as a result.

PRIOR ART DOCUMENT

Patent Documents

Patent document 1: JP-A-2006-199977
Patent document 2: WO2012/063785
Patent document 3: JP-A-2013-217493
Patent document 4: JP-A-2015-227500

SUMMARY OF THE INVENTION

Problem to be Solved by the Invention

Here, the present invention is intended to solve all the problems mentioned above, and it is an object of the present invention to provide a bearing for a motor-type fuel pump that is composed of a Cu—Ni-based sintered alloy which is inexpensive and has a corrosion resistance and abrasion resistance; and a method for producing the same.

Means to Solve the Problem

A sintered bearing for a motor-type fuel pump of the present invention, contains:
10 to 20% by mass of Ni;
2 to 4.5% by mass of Sn;
0.05 to 0.4% by mass of P;
2 to 7% by mass of C; and
a remainder consisting of Cu and inevitable impurities, wherein
the sintered bearing has a metal structure where Sn is uniformly dispersed and distributed in a metal matrix, and has a porosity of 7 to 17% where a free graphite is dispersed and distributed in pores.

A method for producing a sintered bearing for a motor-type fuel pump of the present invention, includes:
a step of blending an elemental Sn powder-containing raw material powder to achieve a composition containing 10 to 20% by mass of Ni, 2 to 4.5% by mass of Sn, 0.05 to 0.4% by mass of P, 2 to 7% by mass of C and a remainder consisting of Cu and inevitable impurities;
a step of producing a compact by press-molding the raw material powder; and a step of sintering the compact at a temperature of 880 to 960° C.

Effects of the Invention

The sintered bearing for a motor-type fuel pump of the present invention, contains: 10 to 20% by mass of Ni; 2 to 4.5% by mass of Sn; 0.05 to 0.4% by mass of P; 2 to 7% by mass of C; and a remainder consisting of Cu and inevitable impurities, wherein the sintered bearing has a metal structure where Sn is uniformly dispersed and distributed in a metal matrix, and has a porosity of 7 to 17% where a free graphite is dispersed and distributed in pores. Thus, the usage amount of Sn which is expensive can be reduced, the bearing can be produced at a low cost, and a superior corrosion resistance and abrasion resistance can be exhibited even in a low-quality gasoline containing an organic acid(s).

DETAILED DESCRIPTION OF THE INVENTION

Figure 1:
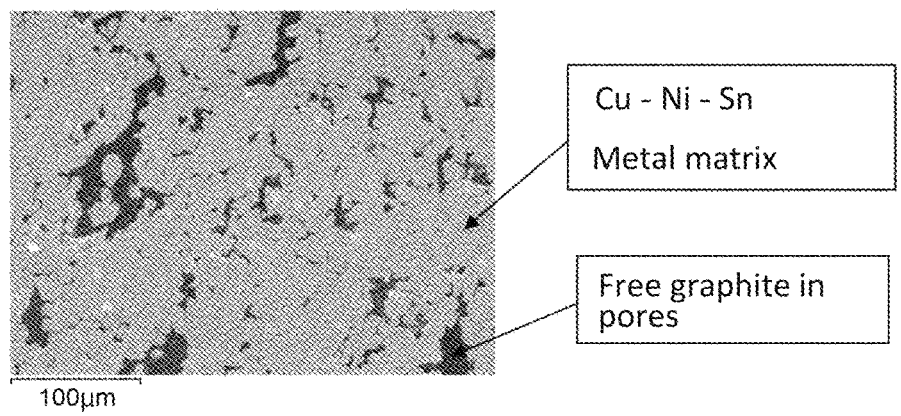
FIG. 1 shows an electron micrograph obtained by observing, with SEM, a sectional structure of an alloy in an example 6 of the present invention (Cu: remainder, Ni: 18.5%, Sn: 3%, P: 0.2%, C: 6%).

The sintered bearing for a motor-type fuel pump of the present invention contains 10 to 20% by mass of Ni, 2 to 4.5% by mass of Sn, 0.05 to 0.4% by mass of P and 2 to 7% by mass of C. The sintered bearing of the invention has a remainder consisting of Cu and inevitable impurities, has a metal structure where Sn is uniformly dispersed and distributed in a metal matrix, and has a porosity of 7 to 17% where a free graphite is dispersed and distributed in pores. Further, due to such composition and others, the sintered bearing of the invention can be produced inexpensively, and exhibit a superior corrosion resistance and abrasion resistance even in a low-quality gasoline containing an organic acid(s).

In addition, a method for producing the sintered bearing for a motor-type fuel pump of the present invention, includes a step of blending an elemental Sn powder-containing raw material powder to achieve a composition containing 10 to 20% by mass of Ni, 2 to 4.5% by mass of Sn, 0.05 to 0.4% by mass of P, 2 to 7% by mass of C and a remainder consisting of Cu and inevitable impurities; a step of producing a compact by press-molding the raw material powder; and a step of sintering the compact at a temperature of 880 to 960° C. In this way, there can be produced the sintered bearing for a motor-type fuel pump of the present invention that has the metal structure in which Sn is uniformly dispersed and distributed in the metal matrix.

The composition etc. of the sintered bearing for a motor-type fuel pump of the present invention is described in detail hereunder. Here, contained amounts described below are all expressed as % by mass.

(1) Ni: 10 to 20% by Mass

Ni forms a Cu—Ni—Sn phase with Sn and Cu when sintered, which imparts a superior corrosion resistance to the bearing. A desired corrosion resistance cannot be achieved when the amount of Ni contained is smaller than 10%. Meanwhile, it is also not preferred when the amount of Ni contained is greater than 20%, because there will only be achieved a small effect of improving corrosion resistance, and a high raw material cost will be incurred.

(2) P: 0.05 to 0.4% by Mass

P has a function effect of promoting the sinterability of the compact, and thus improving the strength of the matrix. When the amount of P contained is smaller than 0.05%, there will only be achieved a small effect of improving the strength of the matrix. Meanwhile, it is not preferred when the amount of P contained is greater than 0.4%, because more Ni—P phases will be precipitated at the grain boundary, which will then impair corrosion resistance.

(3) Sn: 2 to 4.5% by Mass

Sn forms a Cu—Ni—Sn phase with Ni and Cu when sintered, which imparts a superior corrosion resistance to the bearing. A desired corrosion resistance cannot be achieved when the amount of Sn contained is smaller than 2%. Meanwhile, it is not preferred when the amount of Sn contained is greater than 4.5%, because a high raw material cost will be incurred.

(4) C: 2 to 7% by Mass

C is derived from graphite. C mainly exists as a free graphite in the pores dispersed in the matrix, imparts a superior lubricity to the bearing, and thus improves the abrasion resistance thereof. A desired effect cannot be achieved when the amount of C contained is smaller than 2%. Meanwhile, it is also not preferred when the amount of C contained is greater than 7%, because there will only be achieved a small effect of improving abrasion resistance, and the strength of the bearing will rather deteriorate.

(5) Porosity: 7 to 17%

Pores are dispersed in the matrix, and have an effect of controlling the abrasion of the bearing by moderating a strong friction to which the bearing will be subjected under a high-pressure and high-speed flow of a liquid fuel. Such effect is insufficient when the porosity is lower than 7%. Meanwhile, it is not preferable when the porosity is greater than 17%, because the strength of the bearing will deteriorate.

(6) Metal Structure in which Sn is Uniformly Dispersed and Distributed in Metal Matrix By uniformly dispersing and distributing Sn in the metal matrix comprised of Cu—Ni—Sn, a superior corrosion resistance against a low-quality gasoline containing an organic acid(s) can be imparted even with a small amount of Sn of 2 to 4.5% by mass.

In order to uniformly disperse and distribute 2 to 4.5% by mass of Sn in the metal matrix comprised of Cu—Ni—Sn, conditions for an addition method of Sn and a sintering temperature need to be determined appropriately. As a method for adding Sn, there can be considered a method for adding Sn in the form of an elemental Sn powder; and a method for adding Sn in the form of an alloy powder such as an alloy powder of Cu—Sn and Cu—Ni—Sn. However, a Cu—Ni—Sn alloy powder is not preferable, because the powder itself is hard, which will result in a decrease in compression moldability and make it easier for the compact to break. As compared to a Cu—Sn alloy powder, an elemental Sn powder, when employed, can be dispersed in the metal matrix more favorably, and Sn in such case can be efficiently dispersed and distributed in the metal matrix by setting the sintering temperature to 880 to 960° C.

Described hereunder are detailed working examples of the sintered bearing for a motor-type fuel pump of the present invention. Here, the present invention shall not be limited to the following working examples, but may be modified in various ways.

Working Example 1

(1) Production of Sintered Bearing for Motor-Type Fuel Pump

As raw material powders, there were prepared a Cu-25% by mass Ni powder having a particle size of not larger than 100 mesh, a Cu-8% by mass P powder having a particle size of not larger than 250 mesh, an Sn powder having a particle size of not larger than 250 mesh, a graphite powder and an electrolytic Cu powder. These raw material powders were then combined together so as to achieve a composition(s) shown in Table 1. Stearic acid of 0.5% by mass was then added thereto, followed by performing mixing with a V-type mixer for 20 min, and then carrying out press molding under a given pressure so as to obtain a compact. This compact was then sintered at a given temperature of 880 to 960° C. in an endothermic gas (heat-absorbing gas) atmosphere, and was later subjected to sizing, the endothermic gas atmosphere being formed by mixing a natural gas with air and then passing the mixture thereof through a heated catalyst for decomposition and conversion. By these steps, there were produced a bearing of the present invention (referred to as an example(s) of the present invention hereunder) having the composition(s) shown in Table 1 and dimensions of outer diameter: 10 mm×inner diameter: 5 mm×height: 5 mm; and, for comparison purposes, a comparative bearing (referred to as a comparative example hereunder) containing Sn by an amount of smaller than 2%.

(2) Corrosion Resistance Test

A corrosion resistance test was performed on the bearings of the examples of the present invention and the bearing of the comparative example.

An organic acid test solution for use as a pseudo low-quality gasoline was prepared by adding to a gasoline a carboxylic acid represented by RCOOH (R is a hydrogen atom or a hydrocarbon group). After heating this organic acid test solution to 60° C., the bearings of the examples of the present invention and the bearing of the comparative example were then immersed in such organic acid test solution for 100 hours. Next, changes in mass before and after immersion in the organic acid test solution were measured. The results thereof are shown in Table 1.

Changes in mass of the bearings of the examples of the present invention were not higher than 0.87%; a high corrosion resistance was confirmed. In contrast, a change in mass of the bearing of the comparative example was 1.5%; a corrosion resistance significantly inferior to those of the examples of the present invention was confirmed.

(3) Abrasion Resistance Test

An abrasion resistance test was performed on the bearings of the examples of the present invention and the bearing of the comparative example. The condition(s) for the abrasion resistance test were such that the gasoline flowed at a high speed in a narrow space, and a motor generating such high-speed flow rotated at a high speed as well, thus causing each bearing to be subjected to a high pressure and exposed to the gasoline flowing at the high speed. The bearing was at first to be installed into a fuel pump having exterior dimensions of length: 110 mm×diameter: 40 mm, followed by placing such fuel pump into a gasoline tank. Practical experiments were then performed under conditions of impeller rotation frequency: 5,000 to 15,000 rpm, gasoline flow rate: 50 to 250 L/hour, pressure applied to bearing due to high-speed rotation: 500 kPa at maximum, test time: 500 hours. A maximum abrasion depth in a bearing surface after the test was then measured. The results thereof are shown in Table 1.

The maximum abrasion depths of the bearings of the examples of the present invention were not larger than 7.8 μm; a high abrasion resistance was confirmed. In contrast, the maximum abrasion depth of the bearing of the comparative example was 18 μm; an abrasion resistance significantly inferior to those of the examples of the present invention was confirmed.

(4) Analysis by Scanning Electron Microscope (SEM)

A scanning electron microscope (SEM) was used to observe sectional structures of alloys in the examples of the present invention. A magnification for analysis was set to 350 times.

TABLE 1

| Bearing | | Chemical composition (% by mass) | | | | Porosity | Change in mass after corrosion test | Maximum abrasion depth |
| --- | --- | --- | --- | --- | --- | --- | --- | --- |
| | | Ni | Sn | P | C | Cu | % | % | μm |
| Present intervention | 1 | 10.2 | 2 | 0.05 | 2 | Remainder | 7.4 | −0.87 | 7.8 |
| | 2 | 12.7 | 3.5 | 0.1 | 3 | Remainder | 9.6 | −0.72 | 5.1 |
| | 3 | 14.1 | 2.5 | 0.15 | 3 | Remainder | 10.4 | −0.70 | 4.3 |
| | 4 | 16.7 | 3 | 0.2 | 3 | Remainder | 11 | −0.55 | 1.6 |
| | 5 | 17.7 | 3 | 0.15 | 4 | Remainder | 12.7 | −0.51 | 1.0 |
| | 6 | 18.5 | 3 | 0.2 | 6 | Remainder | 15 | −0.43 | 0.8 |
| | 7 | 18.5 | 3 | 0.2 | 7 | Remainder | 16.8 | −0.32 | 2.6 |
| | 8 | 19.8 | 3 | 0.4 | 5 | Remainder | 14 | −0.36 | 0.7 |
| Comparative example1 | | 10.5 | 1 | 0.2 | 2 | Remainder | 12.2 | −1.5 | 18 |

As a result, in the alloys of the examples of the present invention, it was confirmed that pores were dispersed at a ratio of 7 to 17%, and a free graphite was dispersed as well.

As one example, FIG. 1 shows an electron micrograph of an alloy in an example 6 of the present invention (Cu: remainder, Ni: 18.5%, Sn: 3%, P: 0.2%, C: 6%).

(5) Analysis by Energy Dispersive X-Ray Spectroscopy (EDX) with Scanning Electron Microscope (SEM)

With regard to the alloys of the examples of the present invention, an energy dispersive X-ray spectroscopy (EDX) analyzer attached to a scanning electron microscope (SEM) was used to study the distribution of each of the elements Ni, Sn, Cu, P and C in the metal matrix. An analysis condition(s) were such that an accelerating voltage was set to 20 kV, and mapping analysis was then carried out on each of the elements Ni, Sn, Cu, P and C with regard to the sectional structures of the bearings. A magnification for analysis was set to 350 times.

As a result, in the alloys of the examples of the present invention, it was confirmed that Sn was substantially uniformly dispersed and distributed in a meal matrix composed of Cu—Ni—Sn.

Figure 2:
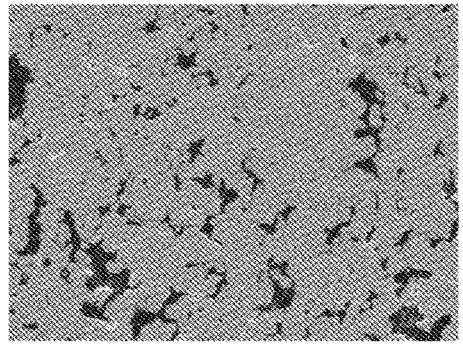
FIG. 2 shows an electron micrograph obtained by observing, with SEM, a sectional structure of an alloy in an example 5 of the present invention (Cu: remainder, Ni: 17.7%, Sn: 3%, P: 0.15%, C: 4%); and mapping diagrams of Ni, Sn, C, Cu and P that were obtained by observation with EDX.
Figure 2:
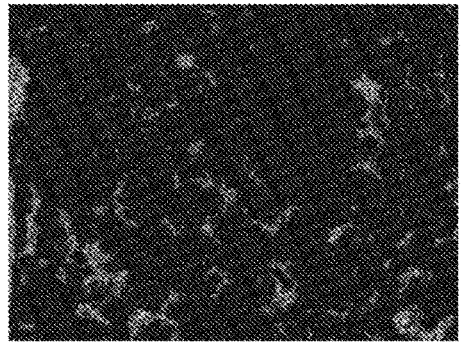
Figure 2:
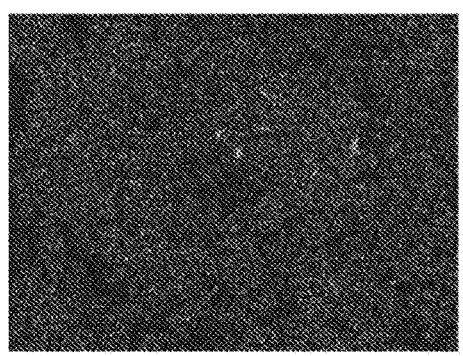
Figure 2:
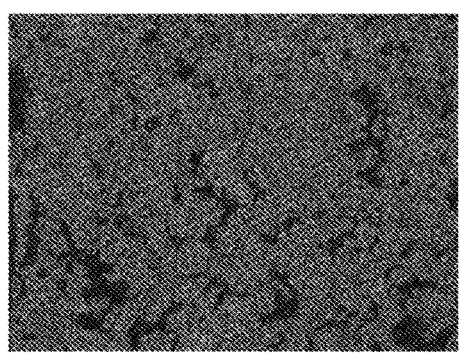
Figure 2:
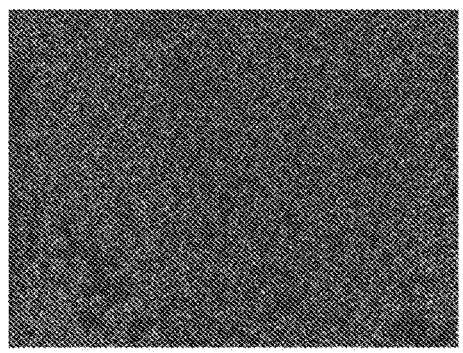
Figure 2:
Figure 3:
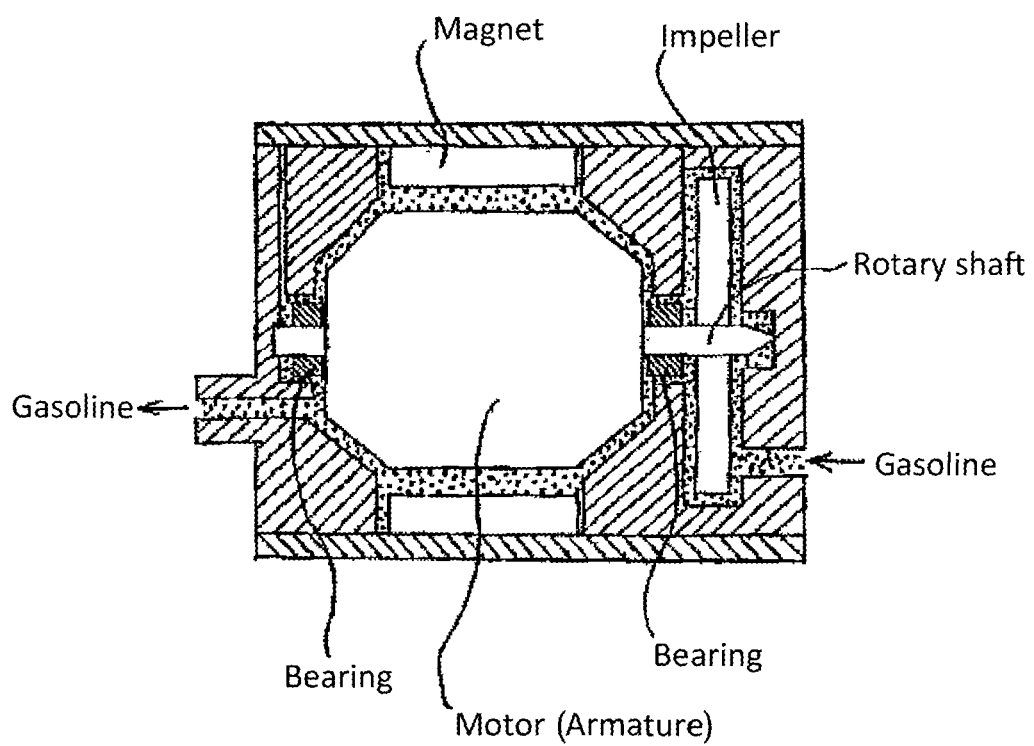
FIG. 3 is a cross-sectional view of a structure of a motor-type fuel pump for a gasoline engine.

As one example, FIG. 2 shows an electron micrograph of an alloy in an example 5 of the present invention (Cu: remainder, Ni: 17.7%, Sn: 3%, P: 0.15%, C: 4%); and mapping diagrams of Ni, Sn, C, Cu and P. As shown in the mapping diagram of Sn, it is clear that Sn is substantially uniformly dispersed and distributed in the metal matrix composed of Cu—Ni—Sn.

The invention claimed is:

1. A sintered bearing for a fuel pump, consisting of:
   10 to 20% by mass of Ni;
   2 to 4.5% by mass of Sn;
   0.05 to 0.4% by mass of P;
   2 to 7% by mass of C; and
   a remainder consisting of Cu and inevitable impurities, wherein the sintered bearing has a metal structure where Sn in a form of a chemical element is uniformly dispersed and distributed in a metal matrix composed of Cu—Ni—Sn, and has a porosity of 7 to 17% where a free graphite is dispersed and distributed in pores.

* * * * *